(12) United States Patent
Ishida et al.

(10) Patent No.: US 6,321,794 B1
(45) Date of Patent: Nov. 27, 2001

(54) CORRUGATED LAMINATED TUBE

(75) Inventors: Yoshimitsu Ishida, Komaki; Tomohide Ito, Kasugai; Atsuo Miyajima, Inuyama; Hiroaki Ito, Kasugai, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/534,197

(22) Filed: Mar. 24, 2000

(30) Foreign Application Priority Data

Mar. 24, 1999 (JP) .................................................. 11-078755

(51) Int. Cl.⁷ ..................................................... F16L 11/00
(52) U.S. Cl. ......................... 138/121; 138/137; 138/141; 138/DIG. 7
(58) Field of Search ........................... 138/121, 137, 138/140, 141, 109, DIG. 7

(56) References Cited

U.S. PATENT DOCUMENTS

| 5,383,087 | 1/1995 | Noone et al. ........................ 361/215 |
| 5,524,673 | 6/1996 | Noone et al. ........................ 138/103 |
| 5,588,469 | * 12/1996 | Kakiuchi et al. .................... 138/137 |
| 5,743,304 | 4/1998 | Mitchell et al. ...................... 138/137 |
| 5,884,671 | 3/1999 | Noone et al. ........................ 138/137 |
| 5,884,672 | 3/1999 | Noone et al. ........................ 138/137 |
| 5,941,286 | * 8/1999 | Fauble et al. ........................ 138/137 |
| 5,983,950 | * 11/1999 | Aoki et al. ....................... 138/121 X |
| 6,242,548 | * 6/2001 | Duchesne et al. .................. 526/255 |

FOREIGN PATENT DOCUMENTS

| 8-30543 | 3/1996 | (JP) . |
| 8-261374 | 10/1996 | (JP) . |
| 95/23685 | 9/1995 | (WO) . |
| 96/05964 | 2/1996 | (WO) . |
| 96/05965 | 2/1996 | (WO) . |
| 96/07695 | 3/1996 | (WO) . |
| 96/12617 | 5/1996 | (WO) . |
| 98/05493 | 2/1998 | (WO) . |

* cited by examiner

Primary Examiner—Patrick Brinson
(74) Attorney, Agent, or Firm—Jacobson Holman, PLLC

(57) ABSTRACT

A corrugated or convoluted laminated tube has a wall formed by an outer resin layer formed from e.g. nylon and a thin inner layer of a THV terpolymer bonded to its inner surface. It is high in flexibility, etc., has a low fuel permeability and is not deformed by swelling with fuel.

19 Claims, 5 Drawing Sheets

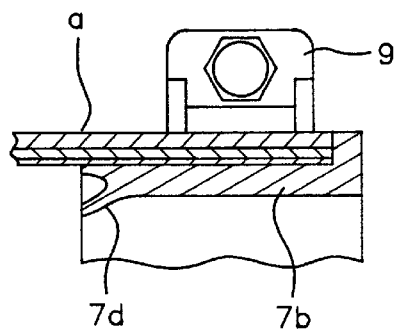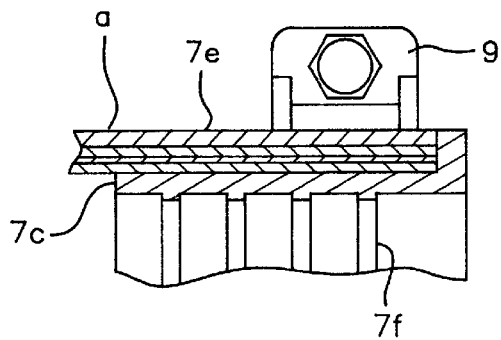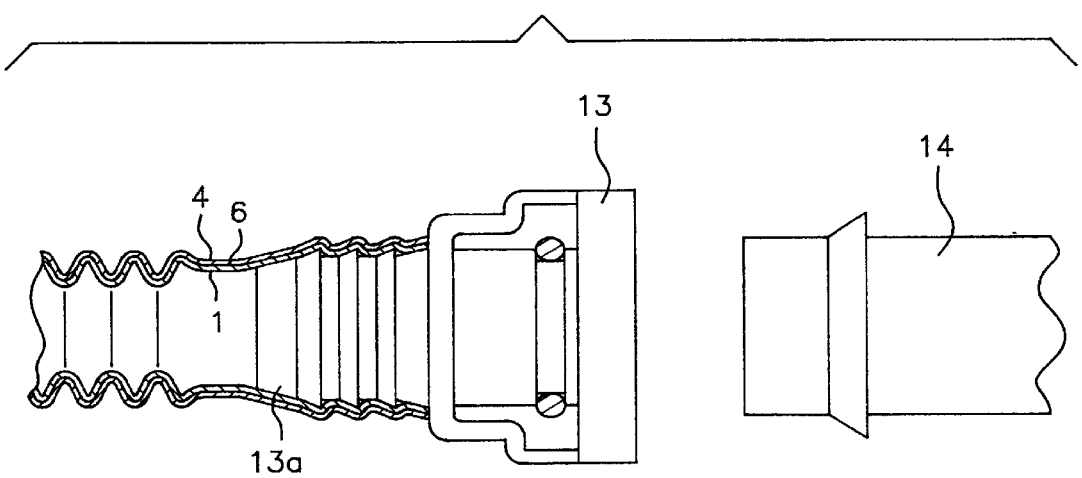

CORRUGATED LAMINATED TUBE

BACKGROUND OF THE INVENTION

1. Field of the Invention

This invention relates to a corrugated or convoluted laminated tube having a wall corrugated or convoluted along at least a portion thereof. The corrugated or convoluted laminated tube of this invention is suitable for use in, for example, a pipeline for automobile fuel (such as gasoline, gasoline containing alcohol, alcohol or hydrogen), or for fuel vapor.

2. Description of the Related Art

It has been usual to use a tube of a polyamide, or other resin, in a pipeline for automobile fuel, or fuel vapor. The resin tube has a low fuel permeability, and a high impact strength.

It has sometimes been the case to use a corrugated or convoluted resin tube having a corrugated or convoluted wall rather than a smooth one having a smooth wall, for the reasons as stated at (1) to (3) below:

(1) A corrugated or convoluted tube is superior to a smooth one in flexibility. Therefore, it can effectively absorb vibration and follow a fairly large relative displacement between the members connected to its opposite ends, respectively.

(2) A corrugated or convoluted tube is superior to a smooth one in deformability and expansibility. Therefore, it can tolerate any abnormal displacement occurring from, for example, the collision of the automobile, and can be bent at a relatively small angle to adapt itself to a limited space available when used for making a pipeline.

(3) In addition, it is superior to a smooth tube in collapsing strength owing to its structural features.

In order to ensure its merits as stated at (1) to (3) above, however, it is necessary for a corrugated or convoluted tube to have its corrugated or convoluted wall formed with a thickness which is smaller than the wall thickness of a smooth tube. Moreover, a corrugated or convoluted wall portion formed along a portion of a tube is smaller in thickness than any smooth wall portion thereof, since such a corrugated or convoluted wall portion is formed by corrugating a portion of the wall of a tube extruded with a uniform wall thickness.

Therefore, it is feared that a corrugated or convoluted tube may be more permeable to fuel because of the smaller thickness of its corrugated or convoluted wall.

Moreover, polyamide, or other particular resins are very likely to swell with fuel if they remain in contact with fuel, or fuel vapor at a high temperature for a long time. If such swelling occurs to a corrugated or convoluted wall of the resin tube, the expansion of its corrugations or convolutions causes the tube to undergo heavy axial expansion and thereby to be permanently deformed.

As a result, the corrugated or convoluted tube is likely to be deformed in such a way as to project from the space available for it and interfere undesirably with any component or part situated around it.

SUMMARY OF THE INVENTION

It is an object of this invention to provide a corrugated or convoluted tube having a wall of low fuel permeability and resisting any deformation as mentioned above, while retaining its merits as stated at (1) to (3) above.

This object is attained by a corrugated or convoluted laminated tube having a wall corrugated or convoluted along at least a portion thereof, the wall comprising at least an outer resin layer and an inner resin layer bonded thereto, the inner resin layer being formed from a THV (tetrafluoroethylene-hexafluoropropylene-vinylidene fluoride) terpolymer satisfying at least one of two conditions as stated at (1) and (2) below:

(1) The terpolymer has a monomer composition consisting of 30 to 80% (by weight throughout this specification) of tetrafluoroethylene, 10 to 30% of hexafluoropropylene and 10 to 50% of vinylidene fluoride; and (2) It has a flexural modulus of 40 MPa or above.

The corrugated or convoluted tube of this invention composed as described above has only a low fuel permeability even if it may have a small wall thickness, since the THV terpolymer is an excellent fuel barrier.

Therefore, if a corrugated or convoluted tube is formed with a small wall thickness, its merits including flexibility, deformability and expansibility can fully be manifested. The THV terpolymer can effectively be used to make a corrugated or convoluted tube exhibiting its characteristic flexibility, deformability and expansibility, since it is the softest material among the fluororesins which are generally hard.

Thus, the corrugated or convoluted laminated tube of this invention satisfies various requirements expected from a corrugated or convoluted tube when it is used in, for example, a pipeline for fuel in an automobile, including its property of absorbing vibration effectively, its adaptability to any abnormal displacement resulting from the collision of the automobile and its relatively high bending deformability which is beneficial when it is used for laying out the pipeline.

A THV terpolymer having a monomer composition failing to fall within the ranges of weight proportions as defined at (1) above, and a flexural modulus lower than 40 MPa is, however, not suitable, since it is not satisfactorily low in fuel permeability. Such a THV terpolymer belongs to the category of "fluororubbers".

The outer resin layer protects the corrugated or convoluted tube from various kinds of external impact or changes. Even if the outer resin layer may be formed from a resin which swells with fuel easily (e.g. polyamide), it is possible to prevent its swelling with fuel and thereby any elongation of the tube, since its THV layer cuts off fuel effectively.

The above and other objects, features and advantages of this invention will become more apparent from the following description and the accompanying drawings.

BRIEF DESCRIPTION OF THE DRAWINGS

FIGS. 4 to 11 are each a fragmentary longitudinal sectional view showing a different structure of a joint formed at one end of a corrugated laminated tube according to this invention.

DETAILED DESCRIPTION OF THE INVENTION

Figure 1:
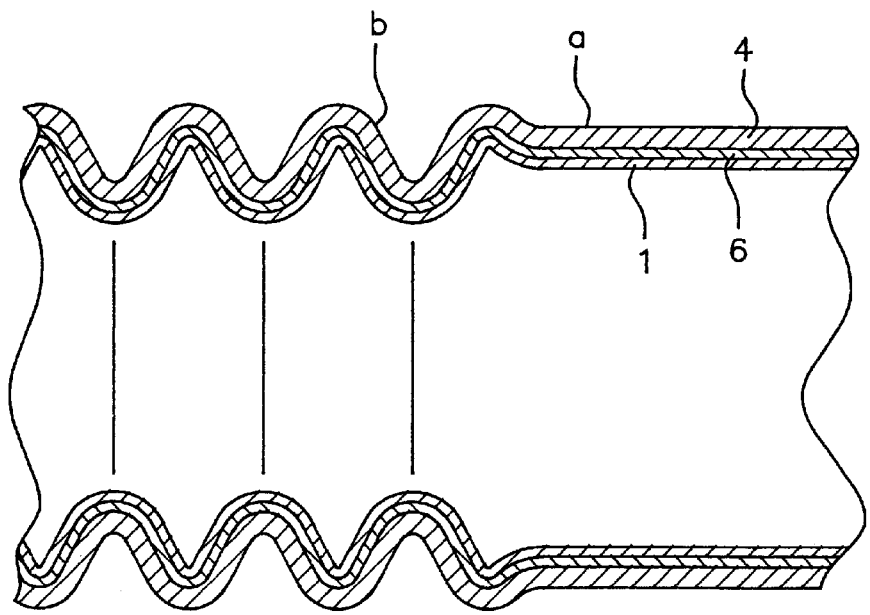
FIG. 1 is a longitudinal sectional view of a portion of a corrugated laminated tube embodying this invention.

According to a first preferred aspect of this invention, the THV terpolymer is electrically conductive. Owing to this feature, there is no accumulation in the tube of this invention of any static electricity generated by, for example, friction between its wall and the fuel flowing in it. Therefore, it is possible to avoid any trouble that might occur from the electric charging of the wall of the tube.

According to a second preferred aspect of this invention, the inner resin layer of the wall of the tube has an inner layer of an electrically conductive THV terpolymer and an outer layer of a THV terpolymer which is not electrically conductive. This feature makes it possible to reduce the necessary amount of the electrically conductive THV terpolymer which is relatively expensive, while retaining the advantages of this invention according to its first preferred aspect.

According to a third preferred aspect of this invention, the inner resin layer has a thickness of 0.05 to 1.0 mm. This feature enables the tube of this invention to maintain a particularly good balance between its low fuel permeability, and its high flexibility, deformability and expansibility.

If the inner resin layer has a thickness exceeding the range stated above, the tube may be of lower flexibility, deformability and expansibility. If its thickness falls short of the range, it may be impossible to obtain a satisfactorily low fuel permeability and a satisfactory result in preventing the outer resin layer from swelling with fuel.

According to a fourth preferred aspect of this invention, the outer resin layer is formed from a resinous material having impact resistance. This feature enables the tube to be protected particularly effectively from, for example, any damage caused by a stone hit by a running automobile.

According to a fifth preferred aspect of this invention, the tube has a wall formed by extruding its inner and outer resin layers and an intermediate adhesive layer coaxially with one another and corrugating or convoluting them as required, and each layer is formed from a material having a relative viscosity index such that when the viscosity index of a layer having the minimum viscosity among the whole layers is assumed to be 1, the viscosity index of a layer having the maximum viscosity is 40 or less. This feature ensures a particularly good adhesion between the inner resin or THV layer and the outer resin layer. If the material of any layer has a relative viscosity index deviating from the above range, those layers may lack uniformity in thickness. Their lack of uniformity in thickness may make the tube lose a good balance between its flexibility and its low fuel permeability and may also make it fail to maintain a good adhesion between the inner and outer resin layers.

According to a sixth preferred aspect of this invention, the tube is used in a pipeline for fuel, or fuel vapor. This feature provides the optimum use of the tube. Its use in a fuel pipeline having a large diameter, for example, as a filler tube, allows it to exhibit its flexibility and low fuel permeability particularly effectively.

Description will now be made of the wall structure of the corrugated or convoluted laminated tube in further detail. The corrugated or convoluted laminated tube of this invention has a wall corrugated or convoluted along at least a portion thereof and formed by at least an outer resin layer and an inner resin layer bonded thereto, and the inner resin layer is formed from a THV terpolymer satisfying at least one of two conditions as set forth at (1) and (2) below:

(1) The terpolymer has a monomer composition consisting of 30 to 80% of tetrafluoroethylene, 10 to 30% of hexafluoropropylene and 10 to 50% of vinylidene fluoride; and (2) It has a flexural modulus of 40 MPa or above.

The tube is usually corrugated or convoluted along a portion of its wall and has a smooth wall portion toward either end thereof with which another tube, or the like will be connected, though it can alternatively be corrugated or convoluted along the whole length of its wall. The tube has a laminated wall formed by the outer resin layer and the inner resin layer formed on its inner surface from a THV terpolymer. Another layer of any appropriate material and structure can be formed on the outer surface of the outer resin layer.

The inner THV layer preferably has a thickness of 0.05 to 1.0 mm. The tube as a whole may have a wall thickness which is not specifically limited, but is preferably, say, from 0.2 to 2 mm.

Description will now be made in detail of a process for manufacturing a corrugated or convoluted laminated tube and a method of bonding its inner and outer resin layers together. While any appropriate process or method can be employed for making a corrugated or convoluted laminated tube according to this invention, or for bonding its inner and outer resin layers together, the following is a description of preferred examples. The inner and outer resin layers are extruded together with an intermediate adhesive layer therebetween. These layers are formed into a particular shape in any known corrugator or a convoluting machine before their cooling. This forming step makes it possible to perform both the bonding of the inner and outer resin layers by the adhesive layer and the formation of corrugations or convolutions simultaneously. The process as described makes it possible to achieve the efficient manufacture of a corrugated or convoluted laminated tube and the bonding of its inner and outer resin layers with a fine adhesive strength.

A material obtained by mixing a diamine or polyamine in the material of the outer resin layer is preferably used for the adhesive layer. A material obtained by carboxylating, maleating or imidizing the material of the outer resin layer is also preferable for the adhesive layer.

Description will now be made of the inner resin layer in further detail. The inner resin layer is formed from a THV terpolymer having a monomer composition consisting of 30 to 80% of tetrafluoroethylene, 10 to 30% of hexafluoropropylene and 10 to 50% of vinylidene fluoride, and/or having a flexural modulus of 40 MPa or above as measured in accordance with ASTM D790.

An electrically conductive THV terpolymer is especially preferred. Although there is no specific limitation, it is preferable to use an electrically conductive THV terpolymer having an electric resistance of $10^6 \Omega \cdot cm$ or below. Any appropriate method can be employed for imparting electrical conductivity to a THV terpolymer, and it is, for example, effective to mix conductive particles, such as carbon black, into the terpolymer.

An electrically conductive THV terpolymer is generally somewhat more expensive. In order to avoid any increase of cost as far as possible, therefore, it is advantageous to form the inner resin layer as a double-layer structure from an inner layer of an electrically conductive THV terpolymer and an outer layer of a THV terpolymer which is not electrically conductive. The inner and outer layers may have a total thickness which is equal to the desired thickness of the inner resin layer.

Description will now be made of the outer resin layer in further detail. One of the functions of the outer resin layer is to protect the tube from, for example, any damage caused by a stone hit by a running automobile. Therefore, it is preferably formed from a resin having at least a certain level of strength and impact resistance.

A polyamide resin (e.g. PA11, PA12, PA6having resistance to calcium chloride, PA612 or a copolymer containing PA612) can be mentioned as a particularly preferable material for the outer resin layer. Other examples include: thermoplastic elastomers based on olefins, such as polyethylene and polypropylene; thermoplastic elastomers based on vinyl chloride; thermoplastic elastomers based on polyesters, such as polybutylene terephthalate or naphthalate; and thermoplastic elastomers based on styrenes or urethanes.

Another layer may be formed on the outer side of the outer resin layer. A preferred example is a solid or spongy thermoplastic elastomer, or EPDM layer which imparts still higher levels of impact strength and flame resistance.

Description will now be made in detail of a joint structure employed for connecting a corrugated or convoluted laminated tube according to this invention. The tube may have a smooth end wall portion where it can be connected to a hard pipe, or the like. Any appropriate joint structure can be employed for connecting the tube, and various forms of structure will be shown later as examples which can be employed.

Description will now be made of the use of a corrugated or convoluted laminated tube according to this invention. The tube is preferably used as, for example, a filler or breather tube in a pipeline for automobile fuel, or fuel vapor. It is particularly suitable as a tube for a fuel pipeline having a large diameter such as a filler tube.

EXAMPLE 1

Corrugated Laminated Tube

FIG. 1 shows a corrugated laminated tube having a smooth wall portion a and a corrugated wall portion b. These wall portions are formed by an inner resin layer 1 formed from a THV terpolymer and having a thickness of 0.1 to 0.4 mm, an adhesive layer 6 formed from a polyamide resin containing an amine-based additive and having a thickness of 0.05 to 0.2 mm and an outer resin layer 4 formed from a polyamide resin and having a thickness of 0.3 to 0.8 mm. The THV layer 1 may be an electric conductor containing, for example, carbon black, or may not be an electric conductor.

The tube according to this Example is made by extruding the inner resin layer 1, adhesive layer 6 and outer resin layer 4 coaxially with one another and forming the corrugated wall portion b in a known corrugator, while bonding those layers together.

EXAMPLE 2

Corrugated Laminated Tube

Figure 2:
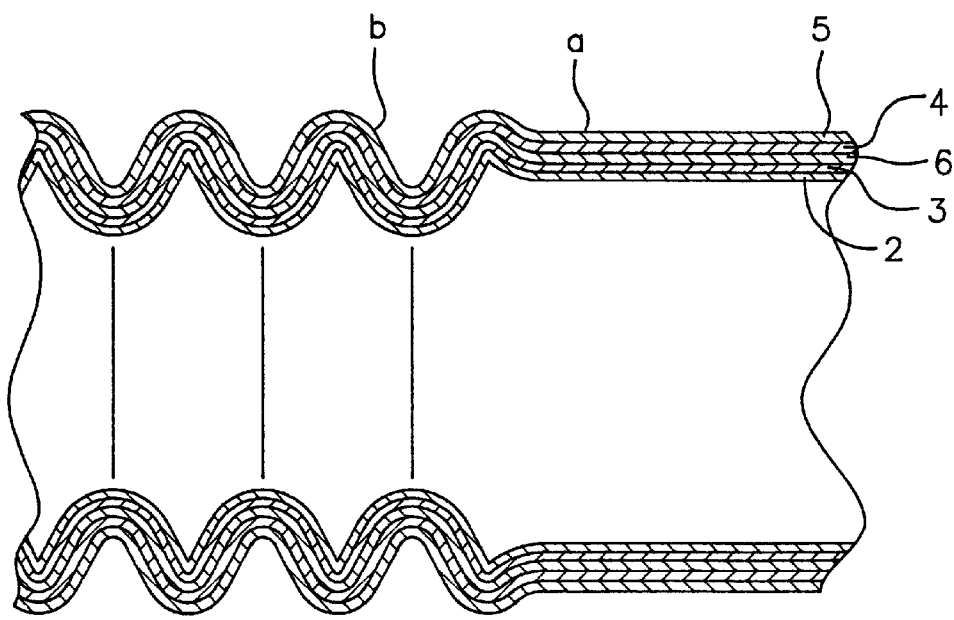
FIG. 2 is a longitudinal sectional view of a portion of another form of corrugated laminated tube embodying this invention.

FIG. 2 shows a corrugated laminated tube in which the above inner resin layer 1 is a laminate formed by an inner layer 2 of a THV terpolymer which is electrically conductive, and an outer layer 3 of a THV terpolymer which is not. The inner and outer layers 2 and 3 have a total thickness which is substantially equal to the thickness of the above inner resin layer 1. Its outer resin layer 4 is further surrounded by a protective layer 5 of spongy EPDM.

The tube is equal in any other respect of construction to that shown in FIG. 1, and no further description is, therefore, made.

Evaluation of Corrugated Laminated Tubes

Tubes as described at (a) to (d) below were prepared, and evaluated for permeability (g/m/test), change in length by swelling with fuel, and flexibility. Each tube had a wall thickness of 1.2 mm in its smooth wall portion.

(a) A corrugated tube having a wall formed by an electrically conductive THV layer having a thickness of 0.15 mm, an adhesive layer and a PA12 layer, which is shown as "Conductive THV/AD/PA12 corrugated tube" in Table 1. The THV terpolymer had a monomer composition consisting of 70% of tetrafluoroethylene, 15% of hexafluoropropylene and 15% of vinylidene fluoride, and had an electric resistance of $1 \times 10^3 \Omega \cdot cm$ and a flexural modulus of 750 MPa.
(b) A corrugated tube having a wall formed by a single PA11 layer, which is shown as "PA11 corrugated tube" in Table 1.
(c) A smooth laminated tube having a wall formed by a polyvinylidene fluoride (PVDF) layer having a thickness of 0.15 mm, an adhesive layer and a PA12 layer, which is shown as "PVDF/AD/PA12 smooth tube" in Table 1.
(d) A smooth tube having a wall formed by a single PA11 layer, which is shown as "PA11 smooth tube" in Table 1.

Figure 3:
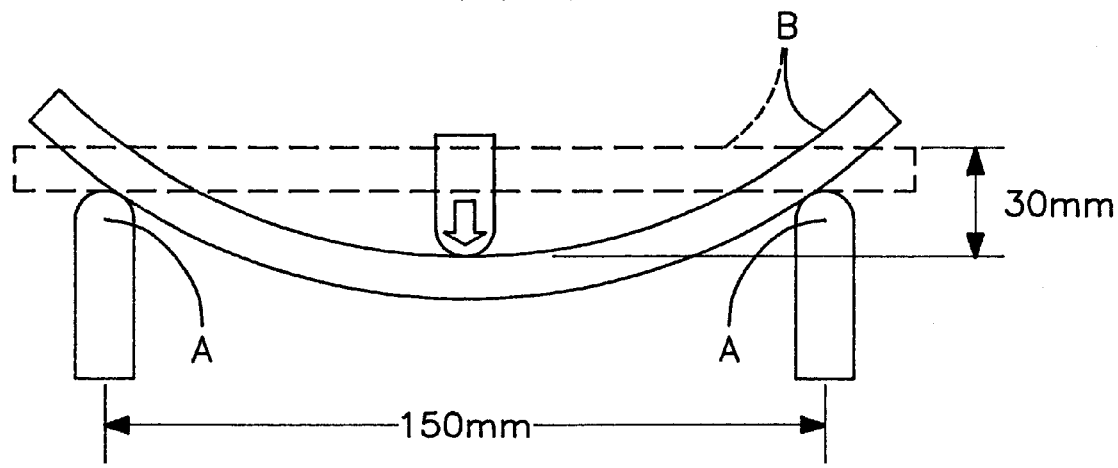
FIG. 3 is a view showing a method of evaluating a tube for flexibility.

The permeability of each tube was determined by using a Shield Housing for Evaporative Determinations (California Air Resources Board diurnal breathing loss pattern). Its change in length was determined by filling it with a mixture of Fuel C and methanol (Fuel C/methanol=85/15 by volume, and Fuel C contains 50% by volume of toluene and 50% by volume of isooctane), holding it at 50° C. for 336 hours and measuring its change (%) in length. Its flexibility was determined by supporting the tube B (if it was a corrugated tube, its corrugated portion) at two points A having a distance of 150 mm therebetween, applying a load to it at right angles to its length midway between the two points A and measuring the load (N) required for flexing it by 30 mm, as shown in FIG. 3. Each tube that kinked during its evaluation for flexibility is marked as such in Table 1. The results of the evaluation are shown in Table 1.

TABLE 1

|  | Conductive THV/AD/PA12 corrugated tube | PA11 corrugated tube | PVDF/AD/ PA12 smooth tube | PA11 smooth tube |
| --- | --- | --- | --- | --- |
| 1.Permeability (g/m/test) | 0.074 | 1.012 | 0.099 | 0.779 |
| 2.change in length | +3.5% | +11.5% | +1.2% | +0.7% |
| 3.Flexibility(N) | 7.7 | 7.8 | Kinked | Kinked |

It is a general tendency found from the results that a corrugated tube is superior to a smooth one in flexibility, as is obvious from a comparison of (b) and (d) . It is also obvious from this comparison that a tube having a higher fuel permeability shows a larger change in length. As is obvious from (a) and (c), however, the tube having a fluororesin layer as its inner resin layer has a by far lower fuel permeability. The corrugated tube (a) having a THV layer as its inner resin layer has a very high flexibility as compared with the smooth tube (c) having a PVDF layer as its inner resin layer. The extent of deterioration in fuel permeability and change in length in case of the tubes (a) and (c) is far smaller from each other than that in case of the tubes (b) and (d).

Joint Structures for Corrugated or Convoluted Laminated Tubes

Figure 4:
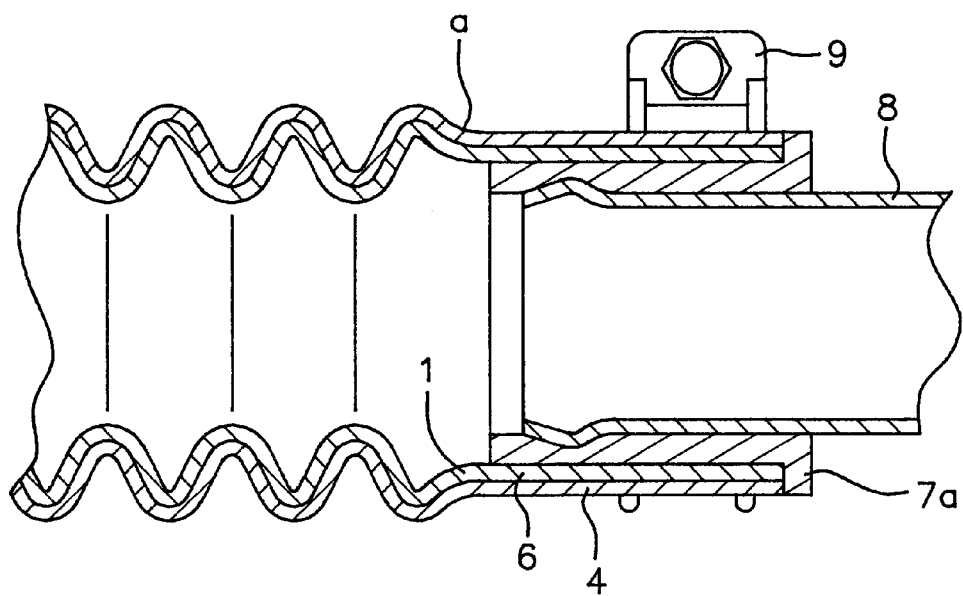
Figure 7:
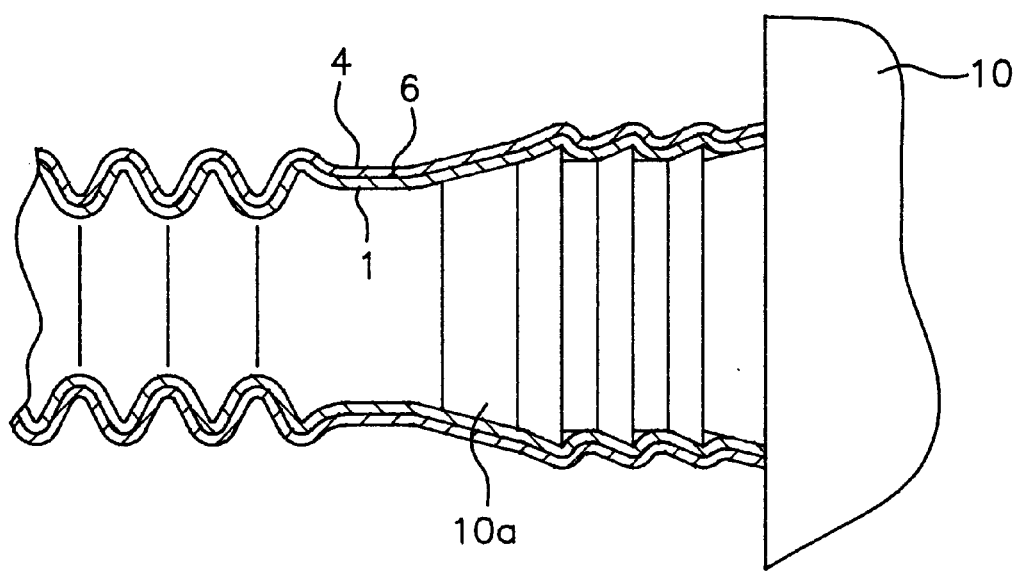
Figure 8:
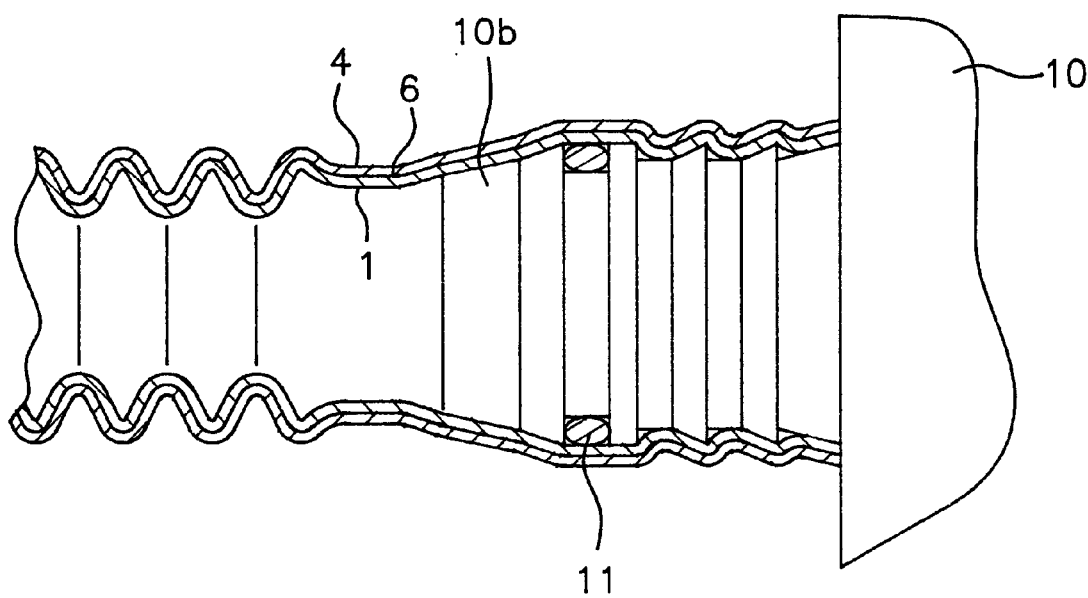
Figure 9:
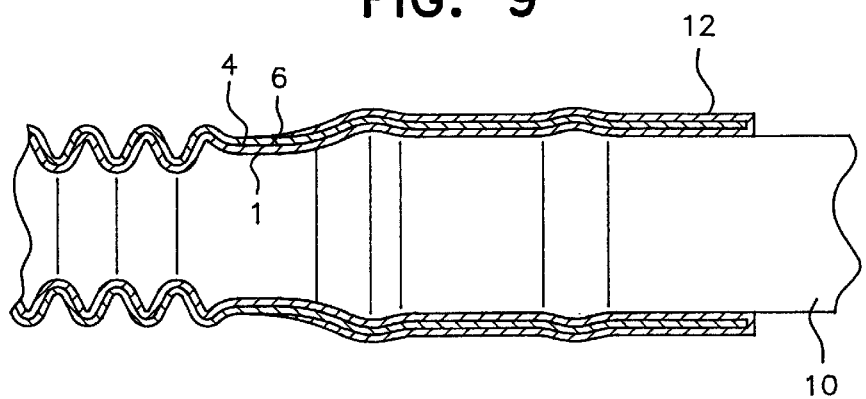
Figure 10:
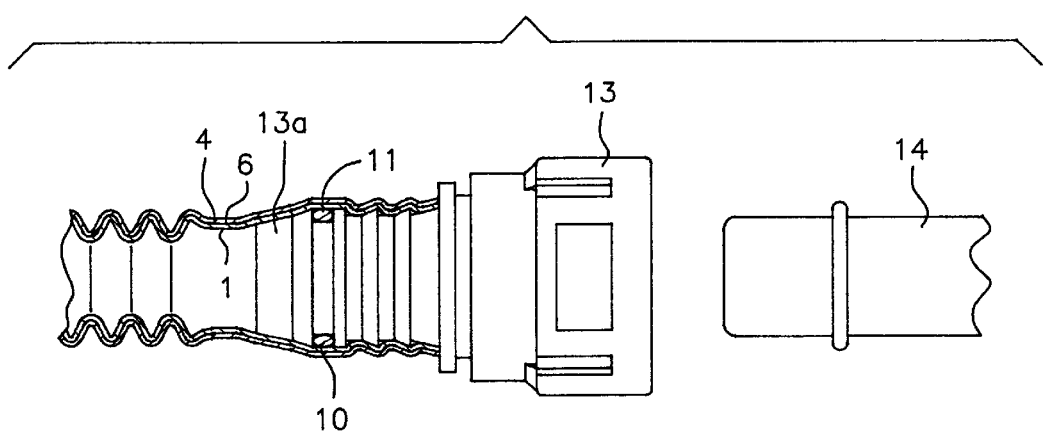

A corrugated or convoluted laminated tube according to this invention can be connected to a pipe, or the like by employing, for example, a rubber cap 7a, 7b or 7c and a clamp 9 as shown in FIGS. 4, 5 or 6. It is also possible to press fit a pipe, or the like directly, as shown in FIGS. 7, 8 or 9. It is, moreover, possible to employ a quick connector which completes connection at a touch, as shown in FIG. 10 or 11.

FIG. 4 shows a corrugated tube having a smooth end wall portion a fitted with the cap 7a in which the pipe 8 is connected. Its end wall portion is tightened by the clamp 9. The cap 7a is formed from a material having a low fuel permeability, such as FKM, NBR-PVC, NBR, H-NBR, hydrin, or a thermoplastic elastomer (based on e.g. vinyl chloride, polyamide, polyester or urethane).

FIGS. 5 and 6 show modified forms of the cap shown in FIG. 4. The cap 7b shown in FIG. 5 has an annular projection 7d protruding radially inwardly from its inner end. The projection 7d makes a tight interfacial seal by closing the inner edge of the interface between the cap 7b and the pipe 8 tightly. The cap 7c shown in FIG. 6 has a plurality of ridges 7e on the outer surface of its circumferential wall and a plurality of ridges 7f on the inner surface thereof, too. The ridges 7e ensure the intimate contact of the cap with the tube and the ridges 7f ensure its intimate contact with the pipe. Thus, they can realize a tight seal between the tube and the cap 7c, or between the cap 7c and the pipe.

FIG. 7 shows a pipe 10 terminating in a tube fitting portion 10a having a series of annular grooves and ridges formed on its outer surface. The tube fitting portion 10a fits tightly in the smooth wall portion a of a corrugated tube to make a tight seal, while being highly resistant to withdrawal. FIG. 8 shows an O-ring 11 fitted about a predetermined portion of the tube fitting portion 10a of the pipe 10 to make a still tighter seal. FIG. 9 shows an elastic coating 12 covering the outer surface of the tube fitting portion of a pipe 10 to make a still tighter seal.

FIGS. 10 and 11 show a quick connector 13 having a tube fitting portion 13a fitted tightly in the smooth wall portion a of a corrugated tube. It enables the corrugated tube to be connected with a pipe 14 quickly at any time. The connector 13 is a known one, and the internal construction of its portion to be connected to the pipe 14 is not shown or described. Its tube fitting portion 13a is similar in construction to the tube fitting portion 10a shown in FIGS. 7 and 8.

While the invention has been described based on its preferred embodiments, it is to be understood that variations will easily occur to those skilled in the art without departing from the scope of this invention which is defined by the appended claims.

What is claimed is:

1. A corrugated or convoluted laminated tube having a wall corrugated or convoluted along at least a portion thereof, said wall comprising at least an outer resin layer and an inner resin layer bonded thereto, said inner resin layer being formed from a THV (tetrafluoroethylene-hexafluoropropylene-vinylidene fluoride) terpolymer satisfying at least one of the following two conditions:

(1) it has a monomer composition consisting of 30 to 80% by weight of tetrafluoroethylene, 10 to 30% by weight of hexafluoropropylene and 10 to 50% by weight of vinylidene fluoride; and (2) it has a flexural modulus of at least 40 MPa.

2. A tube as set forth in claim 1, wherein said terpolymer is electrically conductive.

3. A tube as set forth in claim 2, wherein said terpolymer contains electrically conductive particles which make it electrically conductive.

4. A tube as set forth in claim 3, wherein said particles are of carbon black.

5. A tube as set forth in claim 1, wherein said inner resin layer is formed by an inner layer of an electrically conductive THV terpolymer and an outer layer of a THV terpolymer which is not electrically conductive.

6. A tube as set forth in claim 1, wherein said wall has a thickness of 0.2 to 2 mm.

7. A tube as set forth in claim 1, wherein said inner resin layer has a thickness of 0.05 to 1.0 mm.

8. A tube as set forth in claim 1, wherein said outer resin layer is formed from a resinous material having impact resistance.

9. A tube as set forth in claim 8, wherein said resinous material is at least one material selected from the group consisting of a polyamide resin, an olefin-based thermoplastic elastomer, a vinyl chloride-based thermoplastic elastomer, a polyester-based thermoplastic elastomer, a styrene-based thermoplastic elastomer and a urethane-based thermoplastic elastomer.

10. A tube as set forth in claim 9, wherein said polyamide resin is selected from the group consisting of PA11, PA12, PA6 having resistance to calcium chloride, PA612 and a copolymer containing PA612.

11. A tube as set forth in claim 9, wherein said olefin-based thermoplastic elastomer is selected from the group consisting of polyethylene and polypropylene.

12. A tube as set forth in claim 1, wherein said wall includes a third layer surrounding said outer resin layer to improve its impact strength and flame resistance.

13. A tube as set forth in claim 12, wherein said third layer is a solid or spongy thermoplastic elastomer or EPDM layer.

14. A tube as set forth in claim 1, wherein said wall further includes an adhesive layer between said inner and outer resin layers.

15. A tube as set forth in claim 14, wherein said adhesive layer is of a material obtained by adding a diamine or polyamine to the material of said outer resin layer, or a material obtained by carboxylating, maleating or imidizing the material of said outer resin layer.

16. A tube as set forth in claim 14, wherein each of said inner resin layer, adhesive layer and outer resin layer is of a material having a relative viscosity index such that when the viscosity index of a layer having the minimum viscosity among the whole layers is assumed to be 1, the viscosity index of a layer having the maximum viscosity is 40 or less.

17. A process for manufacturing a corrugated or convoluted laminated tube as set forth in claim 14, comprising extruding said inner resin layer, adhesive layer and outer resin layer together to form a laminated tube and shaping it in a corrugator or a convoluting machine.

18. A method of conveying fuel or fuel vapor by a corrugated or convoluted tube, wherein said tube is a corrugated or convoluted laminated tube as set forth in claim 1.

19. A method as set forth in claim 18, wherein said tube is a filler or breather tube.

* * * * *